UNITED STATES PATENT OFFICE.

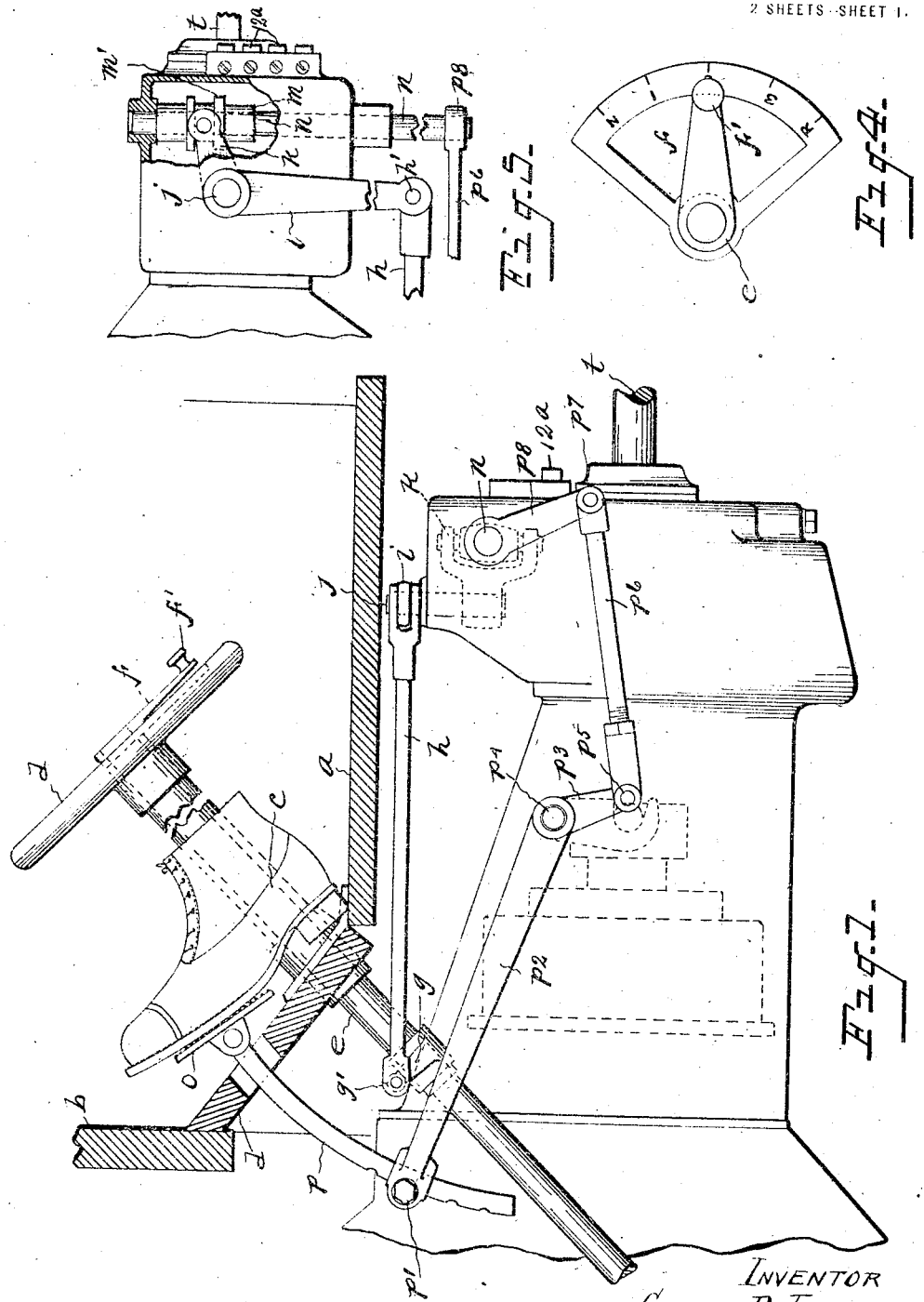

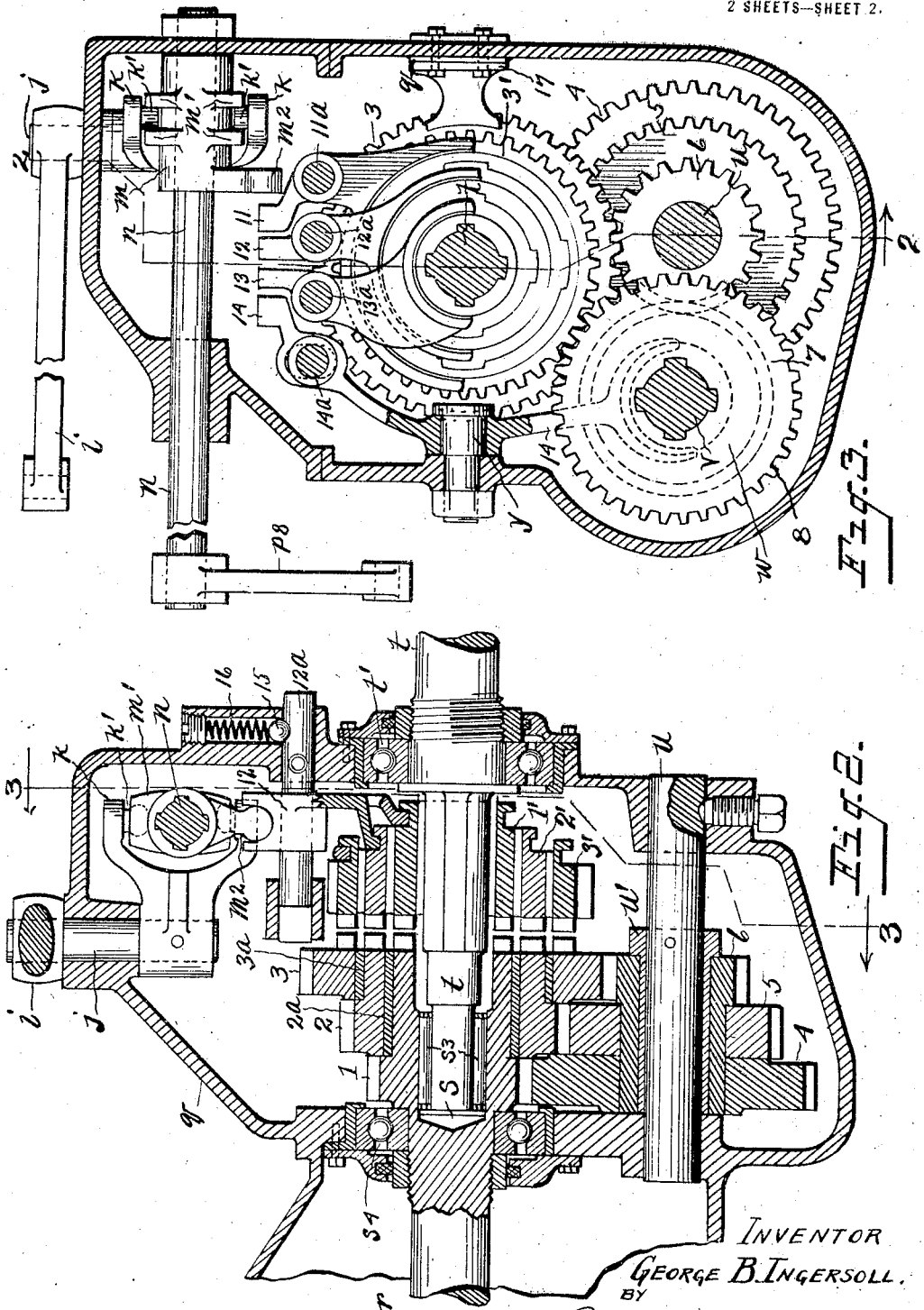

GEORGE B. INGERSOLL, OF DETROIT, MICHIGAN.

SELECTIVE CHANGE-SPEED GEARING AND CONTROL MECHANISM.

1,353,240.

Specification of Letters Patent.   Patented Sept. 21, 1920.

Application filed May 7, 1919.   Serial No. 295,414.

*To all whom it may concern:*

Be it known that I, GEORGE B. INGERSOLL, a citizen of the United States, residing at Detroit, county of Wayne, State of Michigan, have invented a certain new and useful Improvement in Selective Change-Speed Gearing and Control Mechanism, and declare the following to be a full, clear, and exact description of the same, such as will enable others skilled in the art to which it pertains to make and use the same, reference being had to the accompanying drawings, which form a part of this specification.

My invention relates to change speed gearing and mechanism for its selection and control.

The object is to provide a change speed gearing and control system operable from the steering wheel or steering column.

Another object is to provide a change speed gearing, which will do away with the clashing of gears as they are thrown into and out of engagement with each other by providing a constant mesh type of gearing.

Another object is to provide a change speed gear, which by the use of telescopic gears and telescopic collars, and a new method of control and selection will permit of the gears being in constant mesh.

Another object is to provide a change speed gear embodying the telescopic feature which because of its particular form and arrangement of parts can be inclosed in a small compact transmission case In the drawings:

Figure 1 is an elevation, partly in section, of the control mechanism as applied to an automobile.

Fig. 2 is a cross section of the change speed gear and the control connection taken on line 11—11 of Fig. 3.

Fig. 3 is a cross section of the change speed gear and the control mechanism taken on line 111—111, of Fig. 2.

Fig. 4 is a plan view of the speed selecting quadrant mounted on the steering wheel.

Fig. 5 is a top plan view, partly broken away, of the change speed gear casing.

$a$—$a$ is the floor of the automobile.

$b$ is the dash board.

$c$ is the steering post. $d$ is the steering wheel mounted thereon. $e$ is a rotatable sleeve carried by the steering column and adapted to be revolved by means of a hand lever $f$, fitted with handle $f'$.

The lower extremity of sleeve $e$ carries a short arm $g$, pivoted at $g'$ to link $h$. The rearward extremity of link $h$ is pivoted at $h'$ to an arm $i$, which is mounted on post $j$, thereby $j$ so as to rotatably actuate post $j$, thereby reciprocating forked arm $k$. Each fork of arm $k$ is provided with an opposed internally projecting lug $k'$.

A sleeve $m$ is splined on shaft $n$. Sleeve $m$ is provided with a grooved collar $m'$ and is adapted for longitudinal movement on shaft $n$. Lugs $k'$ of forked arm $k$ fit within this groove collar $m'$. Sleeve $m$ carries a downwardly projecting lug $m^2$ which fits into the grooved upper extremities of collar shifting members 11, 12, 13 and 14.

The clutch lever is indicated by $p$. $o$ is the clutch lever foot pedal. $p^2$ and $p^3$ are long and short arms respectively of a rocker arm pivoted at $p^4$. $p^3$ is pivoted at $p^5$ to a connecting rod $p^6$ which is pivoted at $p^7$ to an arm $p^8$, which arm serves to rotatably reciprocate shaft $n$.

The clutch lever connecting with the clutch mechanism is shown in dotted outline but forms no part of this device.

$q$ is the change speed gear casing.

$r$ is the driving shaft from the engine. $l$ is a constant mesh gear carried at the inner end of said driving shaft $r$, and recessed at $s$ for roller bearings $s^3$ supporting mainshaft $t$.

Driving shaft $r$ is supported by bearings $s^4$.

Mainshaft $t$ is supported by bearings $t'$.

The mainshaft is splined or otherwise formed to receive telescopic collars 1'—2' and 3', which are in turn splined to receive each other. The outer periphery of collar 3' is a mesh gear.

The outer extremities of these collars, which are inset one above the other, are grooved as illustrated in Fig. 2 to receive and be hemispherically engaged by collar shifting members 11, 12 and 13.

Collar shifting members 11, 12 and 13 are fixed on their respective shafts 11ª, 12ª and 13ª, which shafts lie in a horizontal plane, and are adapted for longitudinal movement.

A conventional interlocking system is provided, not shown in the drawings, except in so far as illustrated on one of the shafts in Fig. 2, where locking ball 15 is shown as locking the movement of shaft 12ª, being held in a recess in said shaft 12ª by means of a spring 16. This same device is provided for each one of the shafts on which collar shifting members are mounted, including the reverse shifting member shaft $14^a$, hereinafter more particularly described. The longitudinal movement of one of these collar shifting member shafts when it is picked up to throw into engagement its desired gear draws the recess in said shaft away from the locking ball and through the interlocking system provided, locks the other shafts, thus preventing an engagement of the collars actuated by the collar shifting members carried by such shafts. This is standard and nothing new is claimed thereon and it is thought the method employed is familiar and understood.

Driving shaft $r$ carries telescopic gears 1, 2 and 3. Gear 1, previously referred to as constant mesh gear, is fixed to the driving shaft, while 2 and 3 float thereon on supporting bushings $2^a$ and $3^a$ respectively, so as to be independently rotatable.

Gears 1, 2 and 3 are in constant engagement with gears 4, 5 and 6 respectively, carried by the lay shaft $u$. Letter $u'$ is a bushing on the lay shaft $u$. Telescopic gears 1, 2 and 3 are provided with dogs on their inner faces to interlock with corresponding dogs provided on the inner faces of telescopic collars $1'$, $2'$ and $3'$, respectively.

Letter $v$ indicates the countershaft splined for a portion of its distance to receive collar $w$ of similar form and purpose to the collars on the main shaft and which is in constant mesh with gear 6 on the lay shaft $u$. Reverse gear shifting member 14 hemispherically engages collar $w$ in a manner similar to that shown in Fig. 2 of the engagement of the collars on the main shaft by their respective gear shifting members. Collar $w$ is adapted for longitudinal movement on the counter shaft in a manner similar to the movement of the collars on the main shaft, and its inner face is provided with dogs to engage with corresponding dogs provided on the inner face of gear 8, which is rotatably carried on the counter shaft. Gear 8 is in constant mesh with collar $3'$ of the main shaft.

It will be apparent that the shifting of collar $w$ interlocking it with gear 8 will bring the main shaft into rotation in the reverse direction.

Collar $w$ is shifted by means of collar shifting member 14, which is pivotally mounted for a reciprocal rocking movement at $y$. Its engagement with collar $w$ is similar to the engagement of the collar shifting members with the collars mounted on the main shaft and the movement is otherwise similar. To provide for the interlocking of collar shifting member 14, in addition to being pivoted at $y$, it is mounted on shaft $14^a$, which is disposed in a horizontal plane with the shafts $11^a$, $12^a$ and $13^a$. It is mounted on said shaft between two fixed collars, and by means of which the shaft is actuated together with the actuation of the collar shifting member. A sufficient clearance space is allowed, as shown, to provide for the rocking movement of said shifting member 14 upon its pivotal point $y$.

It is evident that this method of gear shifting and control does away with the old commonly known "stick method" of control, and places the speed selecting device where it is most handy, on the steering wheel or column.

The clashing of gears is likewise abolished as the gears are constantly in mesh. The particular arrangement of parts, employment of telescopic collars and gears, and the constant mesh feature provide a very small and compact form of transmission.

The operation of the device is simple and apparent from the drawings.

The collar shifting members, 11, 12, 13 and 14 are located in one vertical plane and the grooves in their upper extremities are in line when said shifting members are out of engagement with their respective gears, which permits of the longitudinal movement of downwardly projecting lug $m^2$ therethrough.

In Fig. 2 the machine is shown in "neutral." If it is desired to go into "low," the clutch lever is thrown out, this movement actuates the rocker arm composed of arms $p^2$ and $p^3$ about its pivotal point $p^4$, forcing $p^6$ and its pivoted connection $p^8$ in a rearwardly direction, rotating shaft $n$ and bringing downwardly projecting lug $m^2$ into line with the grooves in the upper extremities of the collar shifting members. The desired speed is then selected on the speed selecting quadrant mounted on the steering wheel. This rotates sleeve $e$ on the steering post. Through the mechanical chain composed of short arm $g$, links $h$ and $i$, post $j$ is rotated and moves sleeve $m$ longitudinally on shaft $n$ bringing downwardly projecting lug $m^2$ into the groove in the upper extremity of gear shifting member 11. The clutch lever is then released and as it returns to its normal position through the force of the spring or springs in the clutch mechanism itself, shaft $n$ is reciprocally rotated, collar shifting member 11 is moved with its shaft $11^a$ longitudinally of said shaft, telescopic collar $3'$ thereby being brought into engagement by means of its interlocking dogs with gear 3; gear 3 being in constant mesh with gear 6 on the lay shaft which rotates with gears 4 and 5 on the lay shaft, being constantly engaged with constant mesh gear 1 on the driving shaft, thus driving force is transmitted to the main shaft.

17 is one of two opposed bumper brackets, one on each side, projecting out from the side wall of the casing sufficient distance to be brought into contact with gear 3 if the frictional force of withdrawing such gear by its corresponding collar when they are disengaged, seeks to cause the gear to follow the withdrawn collar, the bumper restrains such a tendency on the part of the gear and holds it in its position on the driving shaft.

Having thus described my invention, what I claim is:

1. In a change speed gearing, a clutch, a main shaft, a driving shaft, a lay shaft, a series of telescopic gears mounted on the driving shaft, a series of telescopic gears mounted on the lay shaft constantly in mesh with the gears on the driving shaft, a series of telescopic collars mounted on the main shaft rotatable therewith corresponding with the gears mounted on the driving shaft, selective means for such gearing, and means for engaging individual collars on the main shaft with corresponding gears on the driving shaft coincident with the throwing in of the clutch.

2. The combination in a change speed gearing, of a clutch, a main shaft, a driving shaft, a series of telescopic collars mounted on the main shaft, a corresponding series of telescopic gears mounted on the driving shaft, a selective means for such gearing operable when the clutch is out of engagement, means for automatic engagement of the selected gear when the clutch is thrown into engagement.

3. In a change-speed gearing, the combination of a clutch, a main shaft, a driving shaft, a series of telescopic collars mounted on the main shaft, a corresponding series of telescopic gears mounted on the driving shaft, means for driving said driving shaft gears at varying rates of speed, selective means for such gearing, means for throwing individual collars on the main shaft into engagement with corresponding gears on the driving shaft coincident with the engagement of the clutch.

4. In a change speed gearing, the combination of a clutch, a main shaft, a series of telescopic collars mounted on said main shaft and rotatable therewith but longitudinally movable thereon, a driving shaft, corresponding gears thereon, means for engaging such collars individually with said corresponding gears on the driving shaft, means for automatically shifting such collars from their position of disengagement by throwing the clutch into engagement.

5. In a change speed gearing, a clutch, a main shaft, a driving shaft, a series of telescopic collars mounted on the main shaft, a series of telescopic gears mounted on the driving shaft, a selective means for such gearing, means for automatically throwing the selected collar and its corresponding gear into engagement coincident with the engagement of the clutch.

6. In a change speed gearing, a clutch, a main shaft, a driving shaft, a series of telescopic collars mounted on the main shaft, a series of telescopic gears mounted on the driving shaft, corresponding collar shifting members individually engaging each of said collars, selective means for such gearing operable from the steering wheel, means for automatically shifting such selected collar into engagement with the corresponding gear when the clutch is thrown into engagement.

7. In a change speed gearing, a clutch, a main shaft, a driving shaft, a series of telescopic collars mounted on the main shaft, rotatable therewith but adapted for longitudinal movement thereon and whose inner faces lie in a vertical plane when disengaged, a corresponding series of telescopic gears mounted on the driving shaft and whose inner faces lie in a vertical plane when disengaged, means for selecting the desired change speed collar, and means for throwing the same into engagement with its corresponding driving gear coincident with the throwing in of the clutch.

8. In a change speed gearing, a clutch, a main shaft, a driving shaft, a series of telescopic gears mounted on the driving shaft, a corresponding series of telescopic collars mounted on the main shaft rotatable therewith but adapted for longitudinal movement thereon, interlocking means provided on the inner faces of each of said gears and collars, so that constituent members of pairs when interlocked will rotate as one piece, a plurality of collar shifting members one engaging with each of said shiftable collars, a gear selecting means, comprising a selector adapted to co-act with each of said collar shifting members, means for bringing such selector into position to actuate said collar shifting member, means for actuating such selector together with the selected collar-shifting member to bring the collar into engagement with its corresponding gear coincident with the throwing in of the clutch, means for automatically locking said disengaged collars in such position of disengagement.

9. In a change speed gearing the combination of a clutch, a main shaft, a driving shaft, a series of telescopic driving gears having locking surfaces mounted on the driving shaft such locking surfaces adapted to engage collars mounted on the main shaft, a series of corresponding telescopic collars having locking surfaces mounted on the main shaft and rotatable therewith, but individually, longitudinally movable thereon, a plurality of corresponding collar shifting members whose lower extremities engage corresponding collars, a part adapted to coact with each of said collar shifting members, a selective means for such change speed gearing operable from the steering wheel or column for bringing such coacting part into engagement with the desired collar shifting member, means for throwing such collar into engagement with its corresponding gear coincident with the engagement of the clutch, means for automatically locking the disengaged collars in their position of disengagement.

10. In a change speed gearing, the combination of a clutch, a driving shaft, a main shaft, a lay shaft, a series of telescopically mounted gears on said driving shaft, a series of telescopically mounted gears on said lay shaft so as to be constantly in mesh with the gears on the driving shaft, a series of telescopically mounted collars on the main shaft rotatable therewith but longitudinally movable thereon, means for engaging individual collars on the main shaft with corresponding gears on the driving shaft, means for selecting change speed gearing desired, means for driving the main shaft by bringing the selected collar thereon into engagement with its corresponding gear on the driving shaft.

In testimony whereof, I sign this specification.

GEORGE B. INGERSOLL.